United States Patent [19]

Hozumi et al.

[11] 3,935,152

[45] Jan. 27, 1976

[54] STYRENE-ACRYLONITRILE RESIN COMPOSITION HAVING GOOD PARTING PROPERTY

[75] Inventors: Yukio Hozumi; Akira Ohi; Tatuhiko Imai, all of Sakai, Japan

[73] Assignee: Daicel Ltd., Osaka, Japan

[22] Filed: May 6, 1974

[21] Appl. No.: 467,091

[30] Foreign Application Priority Data

May 10, 1973 Japan.................................. 48-51903

[52] U.S. Cl.... 260/30.4 N; 260/45.8 A; 260/85.5 R; 260/85.5 HC; 260/85.5 S
[51] Int. Cl.²...................... C08K 5/15; C08F 220/42; C08F 220/70
[58] Field of Search...................... 260/30.4 R, 85.5 R, 260/85.5 HC, 260/85.5 S, 45.8 A, 30.4 N

[56] References Cited
UNITED STATES PATENTS
3,817,900  6/1974  Higuchi............................ 260/30.4 R Primary Examiner—Joseph L. Schofer
Assistant Examiner—Herbert J. Lilling
Attorney, Agent, or Firm—Woodhams, Blanchard and Flynn

[57] ABSTRACT

A styrene-acrylonitrile resin composition having a good parting property comprising a styrene-acrylonitrile resin having blended therein, an α-olefin epoxide of the following formula:

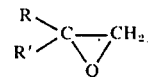

wherein R and R' each is hydrogen or a straight-chain alkyl group, with the proviso that the sum of the carbon atoms in R plus R' is from 8 to 13, preferably 10 to 12.

4 Claims, 1 Drawing Figure

A

U.S. Patent  Jan. 27, 1976  3,935,152
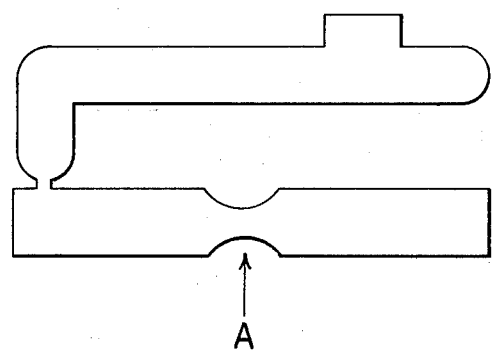

STYRENE-ACRYLONITRILE RESIN COMPOSITION HAVING GOOD PARTING PROPERTY

BACKGROUND OF THE INVENTION

1. Field of the Invention

This invention relates to a styrene-acrylonitrile resin composition having a good parting property.

More particularly, this invention relates to a resin composition having an excellent parting property, which is formed by blending in a styrene-acrylonitrile resin, an α-olefin epoxide of the formula

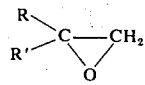

wherein R and R' is hydrogen or straight-chain alkyl, with the proviso that the sum of the carbon atoms in R plus R' is 8 to 13, preferably 10 to 12.

2. Description of the Prior Art

Improvement of the flowability of plastics during molding and/or prevention of sticking or adhesion of plastics on processing machine parts is generally accomplished by adding parting agents to the plastics. It is known that various parting agents are added to styrene-acrylonitrile resins for the above purposes. More specifically, silicone resins, higher fatty acids and their metal salts, higher fatty acid amides, montan wax and the like are incorporated into styrene-acrylonitrile resins as internal release agents during the molding step. However, because of their low compatibility with styrene-acrylonitrile resins, these conventional parting agents reduce the transparency of styrene-acrylonitrile resins and sometimes cause turbidity or whitening of the resin compositions. Further, when molding compositions containing these conventional parting agents are present in a molding machine for a long time, the thermal stability of the resin is degraded. Also, surging is caused to occur in the molding machines when such agents are present in relatively large amounts. Thus, conventional parting agents for styrene-acrylonitrile resins give rise to problems which must be solved. Moreover, as is illustrated in the Example given below, when the molded article to be produced has a constricted portion of relatively small cross-sectional size, because the pressure imposed on this portion is locally increased during the molding step, the parting or releasing property of this constricted portion after the molding step is extremely bad. Frequently it is necessary to separate the molded article from the mold by force. Accordingly, in some extreme cases, this portion becomes bent and broken or is made opaque.

SUMMARY OF THE INVENTION

We have discovered improved parting agents for styrene-acrylonitrile resins which can avoid the foregoing defects of conventional parting agents. We have found that α-olefin epoxides of the formula:

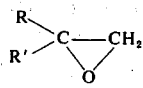

wherein R and R' are hydrogen or straight-chain alkyl, with the proviso that the sum of the carbon atoms in R plus R' is 8 to 13, preferably 10 to 12, provide excellent parting or releasing effects, they have excellent thermal stability and they do not damage or reduce the transparency of styrene-acrylonitrile resins. Moreover, they can give molded articles of good quality even when the molded articles have constricted portions, which otherwise generally cause poor mold release properties.

This invention provides a resin composition comprising a styrene-acrylonitrile resin having incorporated therein, such as by blending, one or more α-olefin epoxides of the above structural formula. The resin composition of this invention exhibits a very excellent parting property even when the molding is performed under a high injection pressure and a locally high pressure is imposed on the constricted portion or portions of the molded article. The inherent transparency of the styrene-acrylonitrile resin is not damaged at all. The parting agent of this invention is also advantageous in that the intended purposes can be attained by employing an amount thereof which is smaller than the amounts of conventional parting agents normally used.

The α-olefin epoxide parting agent of this invention has a boiling point higher than about 250°C and has a very high vapor pressure at 180° to 240°C, at which styrene-acrylonitrile resins are usually molded. When there is molded a styrene-acrylonitrile resin containing other substances, not according to this invention, but having the above-described properties of high boiling point and high vapor pressure at 180° to 240°C, such other substances are generally removed as vapor during the molding step if venting of the resin composition is carried out during the molding. If venting is not carried out, such other substances adhere to the mold surfaces in the form of oily drops, causing various troubles during the molding operation. We have discovered, unexpectedly in view of the prior art, that olefin epoxides, according to this invention, have very good compatibility with styrene-acrylonitrile resins, and that when such resins contain one or more α-olefin epoxides according to our invention, such troubles do not occur during molding. This is another unexpected advantage of the parting agent of this invention.

Moreover, when a resin containing a substance having a high vapor pressure is molded, blowing or the formation of cells in the molded product frequently occurs, thereby degrading the properties of the molded article. However, when the α-olefin epoxides of this invention are employed, such disadvantage does not occur.

The α-olefin epoxides of this invention are incorporated in the styrene-acrylonitrile resin, such as by blending, in an amount of from 0.05 to 0.5 part by weight of epoxide (total) per 100 parts by weight of the styrene-acrylonitrile resin, i.e. in an amount of from 0.05 to 0.5 percent by weight, based on the weight of said resin. When the amount of the α-olefin epoxide is less than 0.05 part by weight, the parting effect is too low. It is not preferred to add the α-olefin epoxide in an amount exceeding 0.5 part by weight, because no particular increase of the parting effect is obtained and such undesired phenomena as surging and stickiness can occur.

In this invention, one or a mixture of two or more of the α-olefin epoxides of the above formula are used singly or in combination. More specifically, there can be employed, for example 1,2-tridecane epoxide, 1,2- tetradecane epoxide, 1,2-pentadecane epoxide, 2-ethyl-1,2-octane epoxide, 2-ethyl-1,2-nonane epoxide, 2-ethyl-1,2-decane epoxide, 2-ethyl-1,2-undecane epoxide, 2-ethyl-1,2-dodecane epoxide, 2-ethyl-1,2-tridecane epoxide, 2-methyl-1,2-nonane epoxide, 2-methyl-1,2-decane epoxide, 2-methyl-1,2-undecane epoxide, 2-methyl-1,2-tridecane epoxide, 2-methyl-1,2-tetradecane epoxide, etc. These α-olefin epoxides can be used singly, or mixtures of two or more of them can also be employed.

In this invention, the kind of the styrene-acrylonitrile resin employed in the molding composition is not critical. Styrene-acrylonitrile resins that can be employed in this invention are those consisting essentially of copolymers containing from 10 to 50 weight percent of acrylonitrile and the balance is styrene.

The resin composition of this invention can also contain the conventional amounts of additives usually employed in such molding compositions, such as plasticizers, stabilizers, antioxidants, colorants, ultraviolet absorbers, lubricants and the like.

Various known methods can be adopted for incorporating the α-olefin epoxide of this invention into the styrene-acrylonitrile resin. The α-olefin epoxide should preferably be uniformly dispersed in the resin. The molding composition of the invention can be molded by any conventional means such as injection molding, extrusion and the like.

Styrene-acrylonitrile resin compositions containing the α-olefin epoxide of the above structural formula are very stable to heat, light and air, both during and after addition of the parting agent and both during and after molding. No degradation of their mechanical characteristics caused by decomposition, discoloration or deterioration is observed.

It is known that compounds of the following structural formula

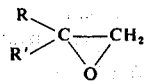

wherein R and R' are hydrogen or straight-chain alkyl, with the proviso that the sum of the carbon atoms in R plus R' is 14 to 42, can be used as lubricants for thermoplastic resins (see German Offen. No. 2,165,749). However, when these compounds are used as parting agents, the transparency of the resin is degraded as shown below. Therefore, these compounds cannot be applied to the uses contemplated by this invention.

BRIEF DESCRIPTION OF THE DRAWING

The drawing is a schematic illustration of the molded test piece employed in the Example.

This invention will now be further described by reference to the following illustrative Example, which by no means limits the scope of this invention.

EXAMPLE

A parting agent according to this invention ( a 1 : 1, parts by weight, mixture of 1,2-dodecane epoxide and 1,2-tetradecane epoxide) was incorporated in an amount of 0.1 part of said parting agent into 100 parts by weight of a commercially available AS resin (Sevian-N 010 manufactured by Daicel K.K.), and the composition was pelletized by means of a vented extruder having a diameter of 40 mm. The pellets were molded into an article having the shape shown in the drawing figure (test piece for tensile testing) by means of an in-line screw injection molding machine (Model TS-100 manufactured by Nissei Jushi K.K.). For purposes of comparison, there were prepared composition (A) the same AS resin but not containing a parting agent and composition (B) the same AS resin containing 0.1 part of an α-olefin epoxide having a total of 22 carbon atoms, and these compositions were similarly pelletized and molded. The lubricity and transparency of each of the molded products were evaluated and the results shown in the following Table 1 were obtained. The parting property was evaluated based on the minimum injection pressure that caused whitening of the portion A in the test piece. As is apparent from the results shown in the following Table 1, in the composition of this invention the parting property is highly improved without degradation of the transparency.

Table 1

| Kind of Parting Agent | Lubricity (minimum pressure causing turbidity or whitening, Kg/cm²) | Transparency (percent transmittance) *3 |
| --- | --- | --- |
| not added | 90 | 95 |
| parting agent of this invention α-olefin *1 epoxide having 16 carbon atoms | 120 | 96 |
| | 120 | 88 |
| α-olefin *2 epoxide having 22 carbon atoms | 125 | 67 |

*1 1,2-hexadecane epoxide
*2 1,2-docosane epoxide
*3 spectrophotometer (Hitachi EPS-3T type)

The embodiments of the invention in which an exclusive property or privilege is claimed are defined as follows:

1. A thermoplastic synthetic resin moldable composition, consisting essentially of
   A. a copolymer of styrene and acrylonitrile, said copolymer having blended therein,
   B. from 0.05 to 0.5 percent by weight, based on the weight of said copolymer, of one or a mixture of parting agents of the formula

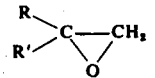

wherein R and R' each represent hydrogen or straight-chain alkyl, with the proviso that the sum of the carbon atoms in R and R' is from 8 to 13.

2. A composition according to claim 1, in which said copolymer consists of 10 to 50 percent by weight of acrylonitrile and the balance is styrene.

3. A composition according to claim 1, in which said lubricant (b) is a mixture of 1,2-dodecane epoxide and 1,2-tetradecane epoxide.

4. A composition according to claim 1, in which the sum of the carbon atoms in R and R' is from 10 to 12.

* * * * *